US009798363B1

(12) United States Patent
Ning et al.

(10) Patent No.: US 9,798,363 B1
(45) Date of Patent: Oct. 24, 2017

(54) COMPUTER MODULE WITH DOUBLE-SIDED MEMORY

(71) Applicant: Facebook, Inc., Menlo Park, CA (US)

(72) Inventors: Jia Ning, Newark, CA (US); Hu Li, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/093,287

(22) Filed: Apr. 7, 2016

(51) Int. Cl.
*G06F 1/18* (2006.01)

(52) U.S. Cl.
CPC ................... *G06F 1/185* (2013.01)

(58) Field of Classification Search
CPC ........................................................ G06F 1/185
See application file for complete search history.

(56) References Cited

U.S. PATENT DOCUMENTS

| | | | | |
|---|---|---|---|---|
| 6,163,464 A * | 12/2000 | Ishibashi | ................ | G06F 1/184 174/261 |
| 6,246,588 B1 * | 6/2001 | Kim | ...................... | H05K 1/141 361/786 |
| 7,298,625 B1 * | 11/2007 | Wu | ......................... | G06F 1/185 174/261 |
| 8,500,454 B2 * | 8/2013 | Hirano | ................. | H05K 7/1445 361/788 |
| 8,995,148 B2 * | 3/2015 | Kyle | .................... | H01R 43/205 361/788 |
| 2005/0207098 A1 * | 9/2005 | Malone | ..................... | G06F 1/20 361/679.48 |
| 2007/0091559 A1 * | 4/2007 | Malone | .................. | G06F 1/187 361/679.32 |

* cited by examiner

*Primary Examiner* — Lisa Lea Edmonds
(74) *Attorney, Agent, or Firm* — Perkins Coie LLP

(57) ABSTRACT

A computer module with double-sided memory including a module chassis and a motherboard having first and second sides mounted to the module chassis. A portion of the second side of the motherboard confronts a portion of the module chassis. A central processing unit is mounted to the first side and a first plurality of elongate memory sockets are mounted to the first side and spaced apart a first distance. A second plurality of elongate memory sockets is mounted to the second side of the motherboard and spaced apart by the first distance. The second plurality of elongate memory sockets is parallel to and laterally offset from the first plurality of elongate memory sockets by a second distance approximately half the first distance. One or more memory modules are mated with selected ones of the first and second plurality of memory sockets.

20 Claims, 6 Drawing Sheets

COMPUTER MODULE WITH DOUBLE-SIDED MEMORY

TECHNICAL FIELD

This patent application is directed to a computer module with memory mounted on a printed circuit board.

BACKGROUND

Conventional computer modules include a motherboard with a central processing unit (CPU), memory, and other components mounted on one side of the motherboard. Although some smaller components (e.g., resistors) are mounted to a second side of the motherboard, the larger components, such as the CPU and memory cards, are typically mounted on one side to facilitate mounting the motherboard in a chassis.

BRIEF DESCRIPTION OF THE DRAWINGS

The computer module with double-sided memory introduced here may be better understood by referring to the following Detailed Description in conjunction with the accompanying drawings in which like reference numerals indicate identical or functionally similar elements.

Figure 1:
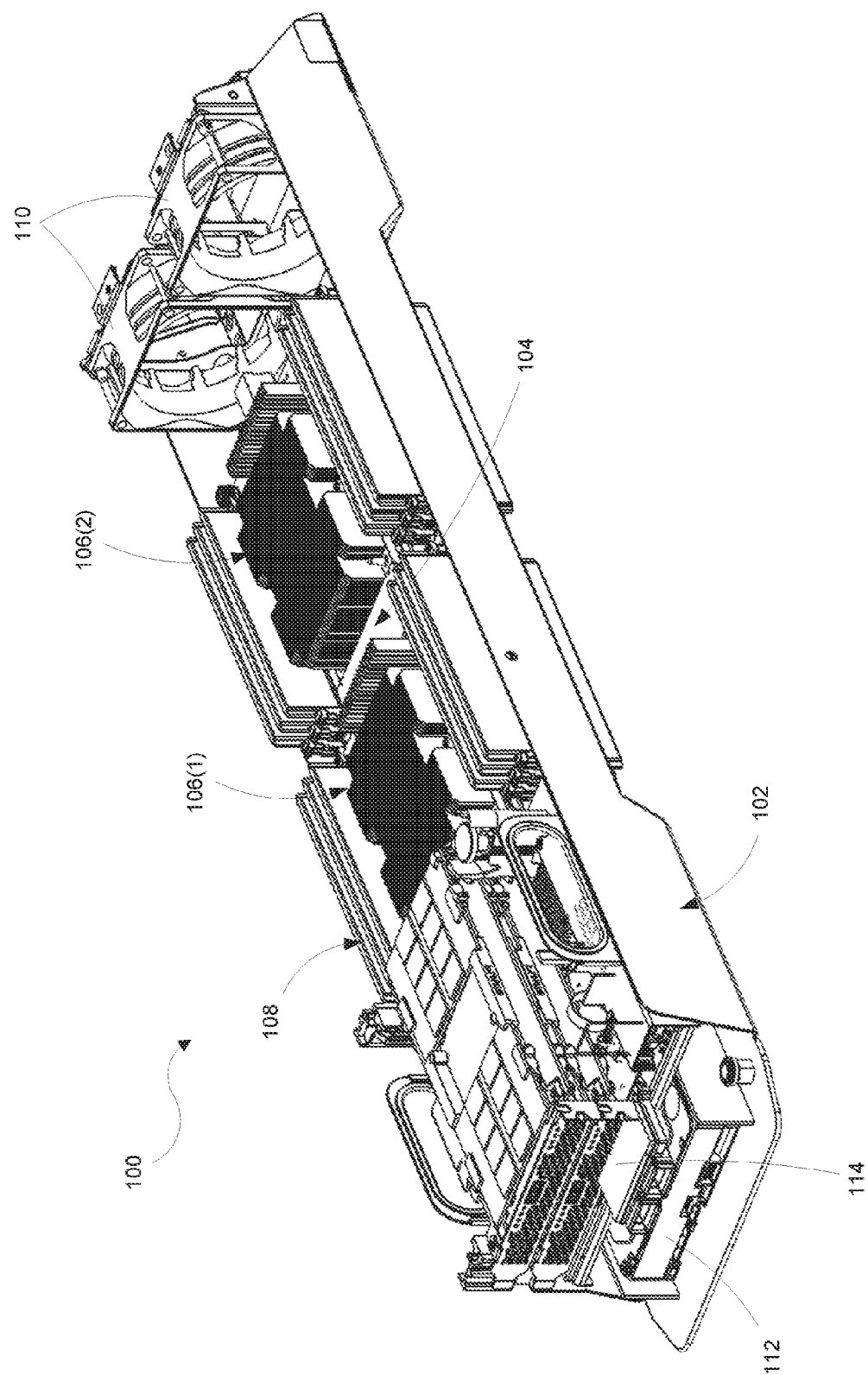
FIG. 1 is an isometric view of a computer module with double-sided memory according to a representative embodiment.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of this disclosure.

DETAILED DESCRIPTION

Overview

A computer module with double-sided memory is disclosed. In a representative embodiment, the computer module includes a module chassis and a motherboard mounted to the module chassis. At least one central processing unit is mounted to a first side of the motherboard and a first plurality of elongate memory sockets or connectors are mounted to the first side and spaced apart from each other by a first distance. At least a portion of a second side of the motherboard confronts a portion of the module chassis. A second plurality of elongate memory sockets is mounted to the second side of the motherboard and spaced apart from each other by the first distance. The second plurality of elongate memory sockets is parallel to and laterally offset from the first plurality of elongate memory sockets by a second distance approximately half the first distance. One or more memory modules are mated with selected ones of the first and second plurality of memory sockets. Mounting the memory sockets and corresponding memory modules on opposite sides of the motherboard provides greater memory capacity than if memory was mounted on only one side of the motherboard. Offsetting the memory sockets allows the sockets to be mounted to the motherboard on opposite sides without the alignment features of the sockets interfering with each other.

General Description

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a computer module 100 with double-sided memory according to a representative embodiment. The computer module 100 includes a module chassis 102 supporting a motherboard 104. The motherboard 104 includes a pair of CPUs 106(1) and 106(2). In the illustrated embodiment, each of the CPUs 106(1) and 106(2) supports six channels, each having two memory modules 108, for a total of twelve memory modules per CPU. In some embodiments, the computer module 100 also includes cooling fans 110 and storage and communication modules 112 and 114, respectively. Although, the computer module 100 is described herein with respect to two CPUs having six channels and twelve associated memory modules arranged in four sets of three, other combinations and configurations are possible. In some embodiments, the computer module 100 can be configured as a server, for example.

Figure 2:
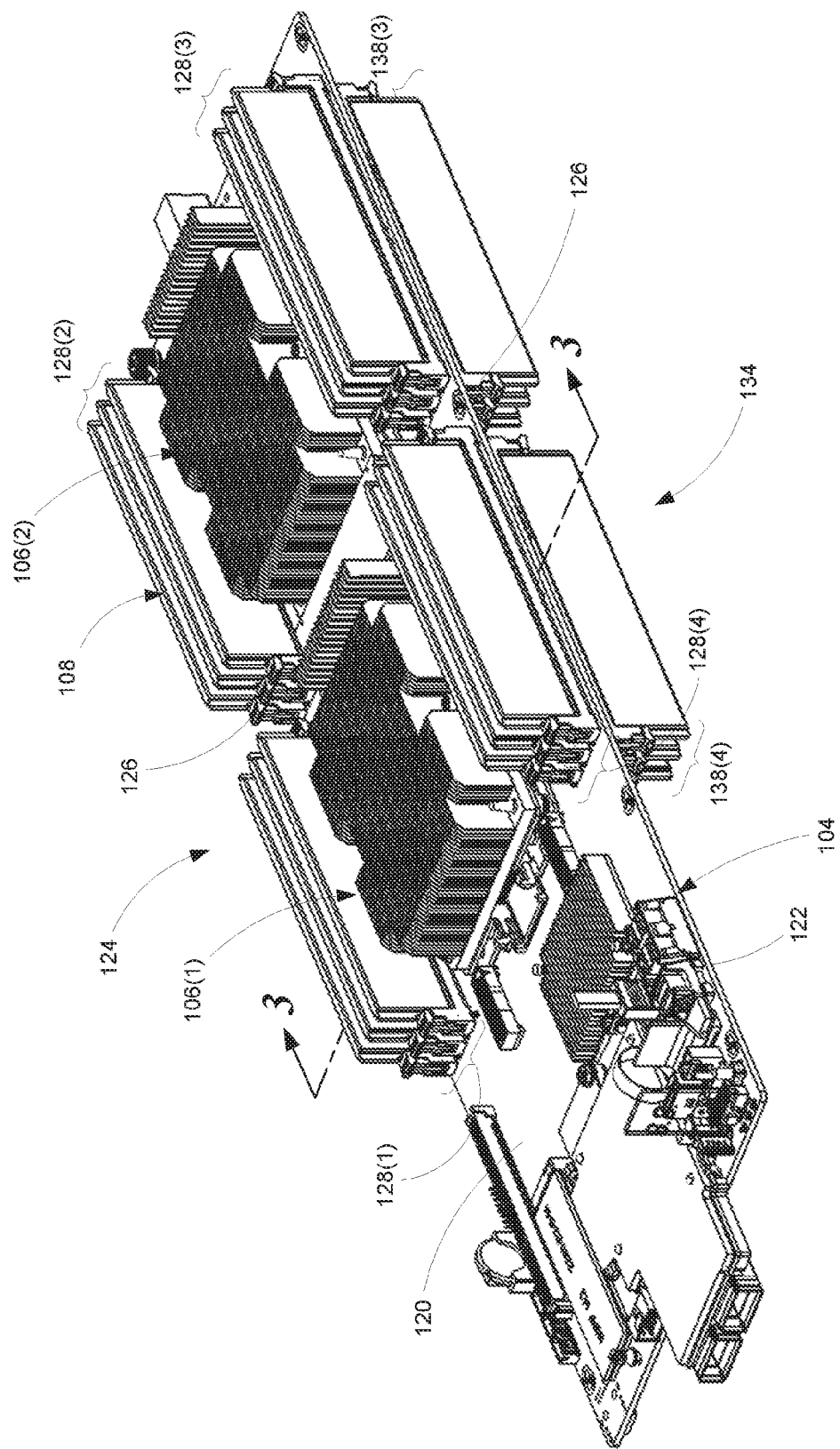
FIG. 2 is an isometric view of the motherboard shown in FIG. 1.
Figure 3:
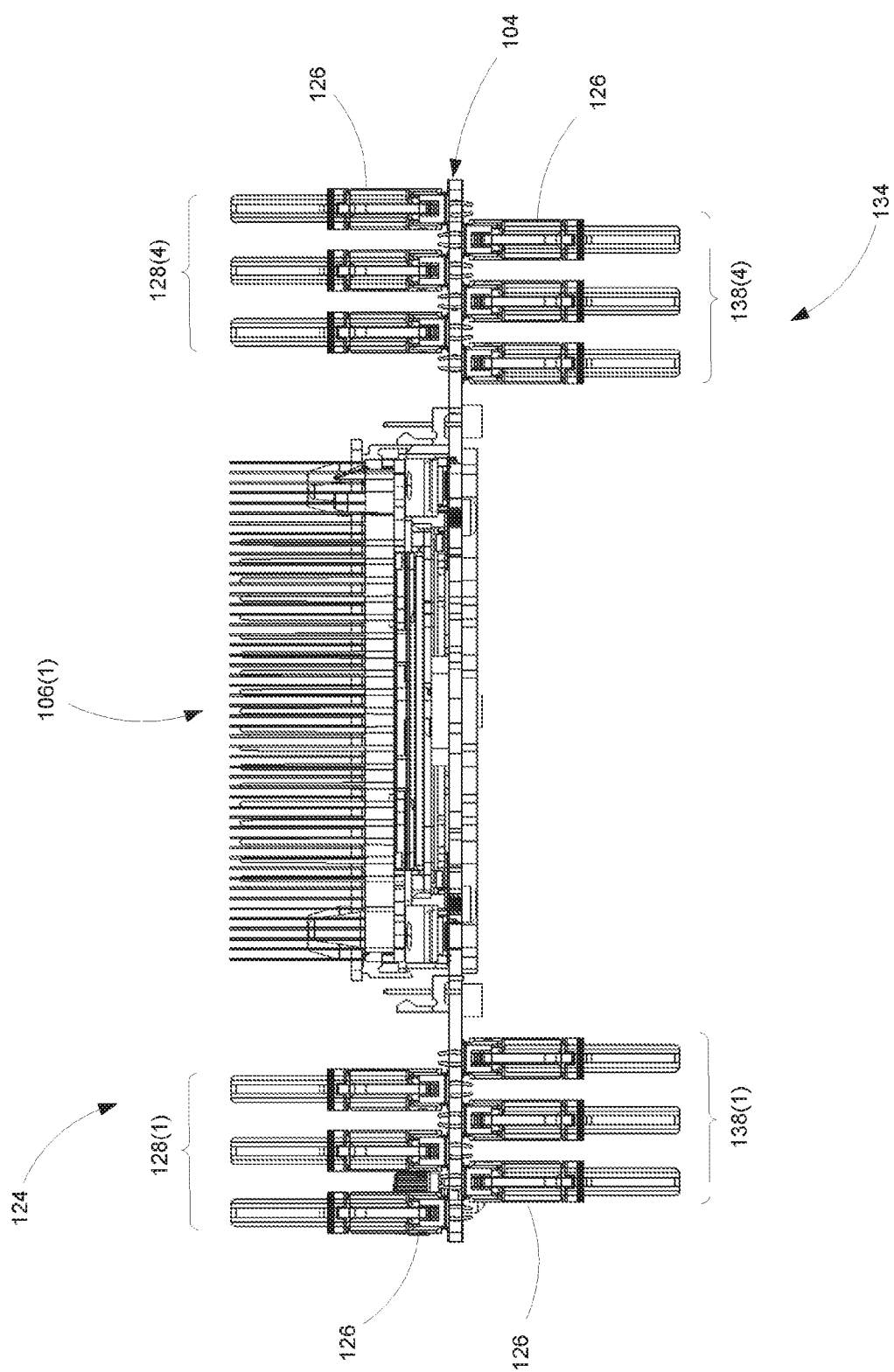
FIG. 3 is a cross-section of the motherboard taken about lines 3-3 in FIG. 2.

As shown in FIG. 2, the motherboard 104 has a first side 120 opposite a second side 122. The CPUs 106(1) and 106(2) are mounted to the first side 120. A first plurality 124 of memory sockets 126 and corresponding memory modules 108 is mounted to the first side 120 and arranged in four sets of three memory sockets 126 and corresponding memory modules 108. Specifically, the first plurality 124 comprises memory socket sets 128(1)-128(4). A second plurality 134 of memory sockets 126 and corresponding memory modules 108 is mounted to the second side 122 of the motherboard 104. With further reference to FIG. 3, the second plurality 134 comprises memory socket sets 138(1)-138(4), and the second plurality 134 is interleaved with and offset from the first plurality 124. Thus, the memory sockets 126 of the second plurality 134 are positioned between the memory sockets 126 of the first plurality 124. The second plurality 134 is offset in-board of the first plurality 124. For example, the memory socket set 138(1) is offset in-board of the memory socket set 128(1). In the illustrated embodiment, the first and second pluralities 124 and 134 can be interleaved and offset from each other relative to a first axis, and aligned with each other relative to a second axis perpendicular to the first axis. Accordingly, the first and second pluralities 124 and 134 are parallel to each other relative to the second axis because they are co-linear. In other embodiments, the first and second pluralities 124 and 134 can be interleaved and offset from each other relative to the first axis and offset but still parallel to each other relative to the second axis.

Figure 4:
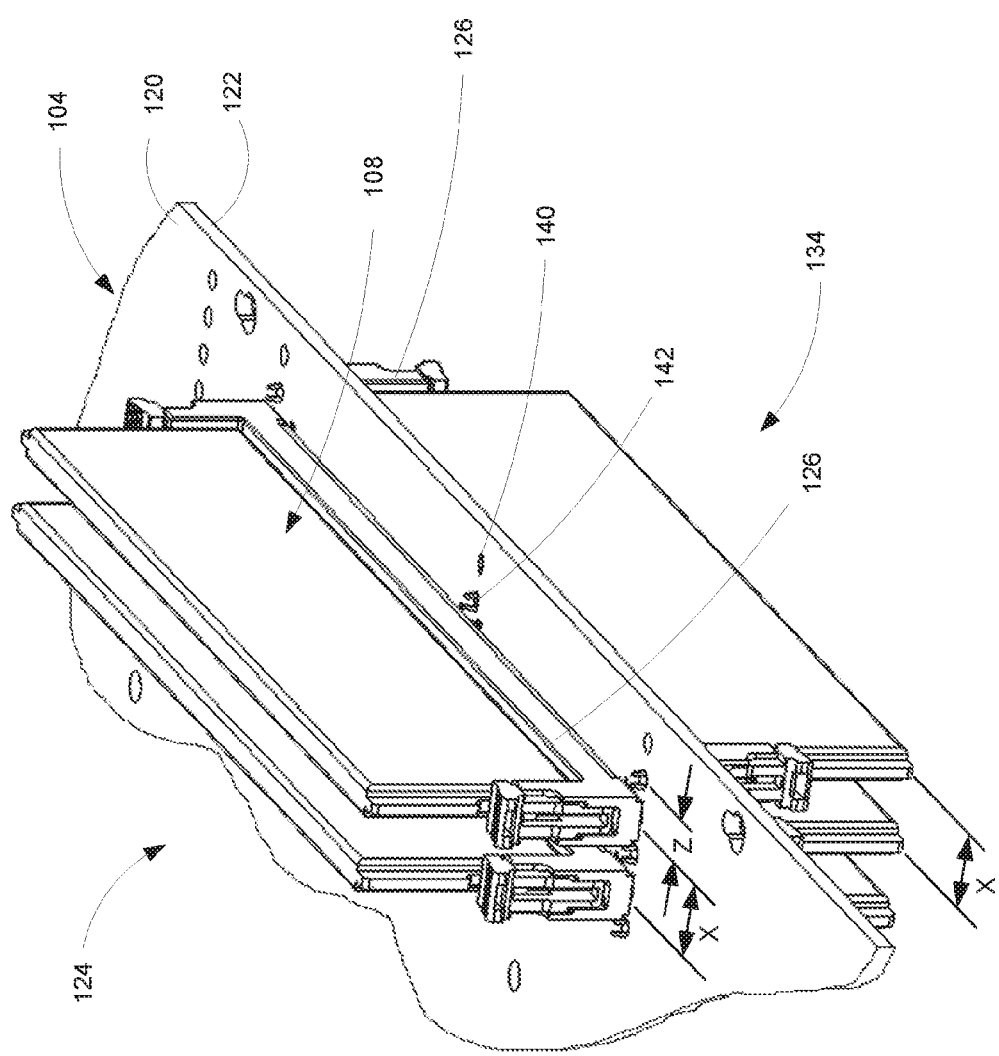
FIG. 4 is a partial isometric view of the memory sockets and memory modules.

As shown in FIG. 4, the memory sockets 126 of the first plurality 124 are spaced apart a distance X. In some embodiments, the memory sockets 126 of the second plurality 134 are also spaced apart the same distance X. However, the second plurality 134 is offset from the first plurality 124 a distance Z that is less than the distance X. In some embodiments, the distance Z is approximately half that of distance X. The motherboard 104 includes mounting holes 140 positioned to correspond with alignment features 142 extending from the memory sockets 126. Mounting the memory sockets 126 and corresponding memory modules 108 on opposite sides (120, 122) of the motherboard 104 provides greater memory capacity than if memory was mounted on only one side of the motherboard 104. Offsetting the memory sockets 126 allows the sockets to be mounted to the motherboard 104 on opposite sides without the alignment features 142 interfering with each other. In some embodiments, the memory modules 108 are dual in-line memory modules (DIMM) and the memory sockets 126 comprise surface mount technology (SMT).

Figure 5:
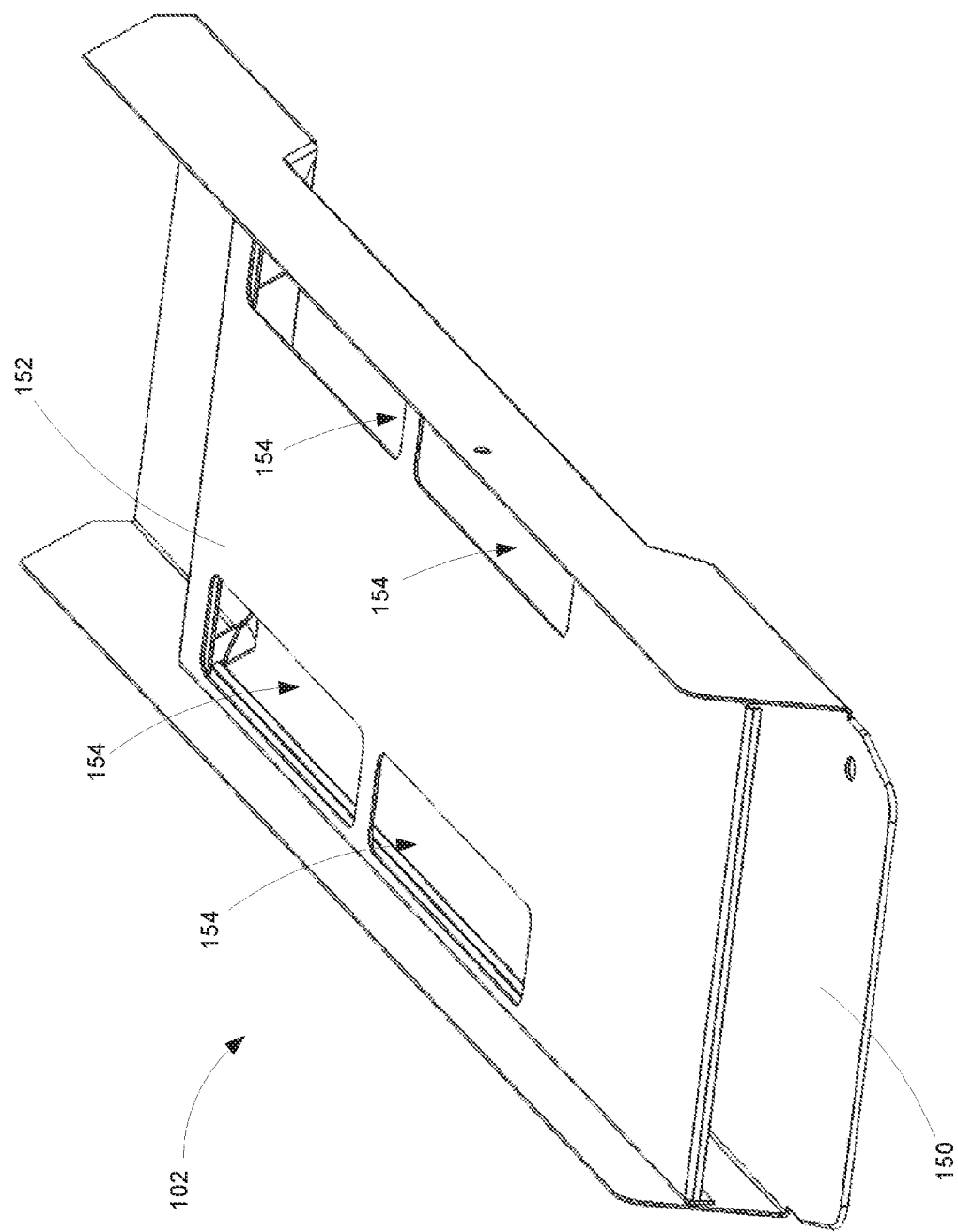
FIG. 5 is an isometric view of the module chassis.

As shown in FIG. 5, the module chassis 102 includes a base 150 and a platform 152. The module chassis 102 is configured to support the motherboard 104 in order to provide clearance for the second plurality 134 of memory sockets 126 and corresponding memory modules 108 that extend below the motherboard 104 (see FIG. 4). In some embodiments, the motherboard 104 rests upon (e.g., confronts) the platform 152. The platform 152 includes a plurality of apertures 154 configured to receive the second plurality 134 therethrough.

Figure 6:
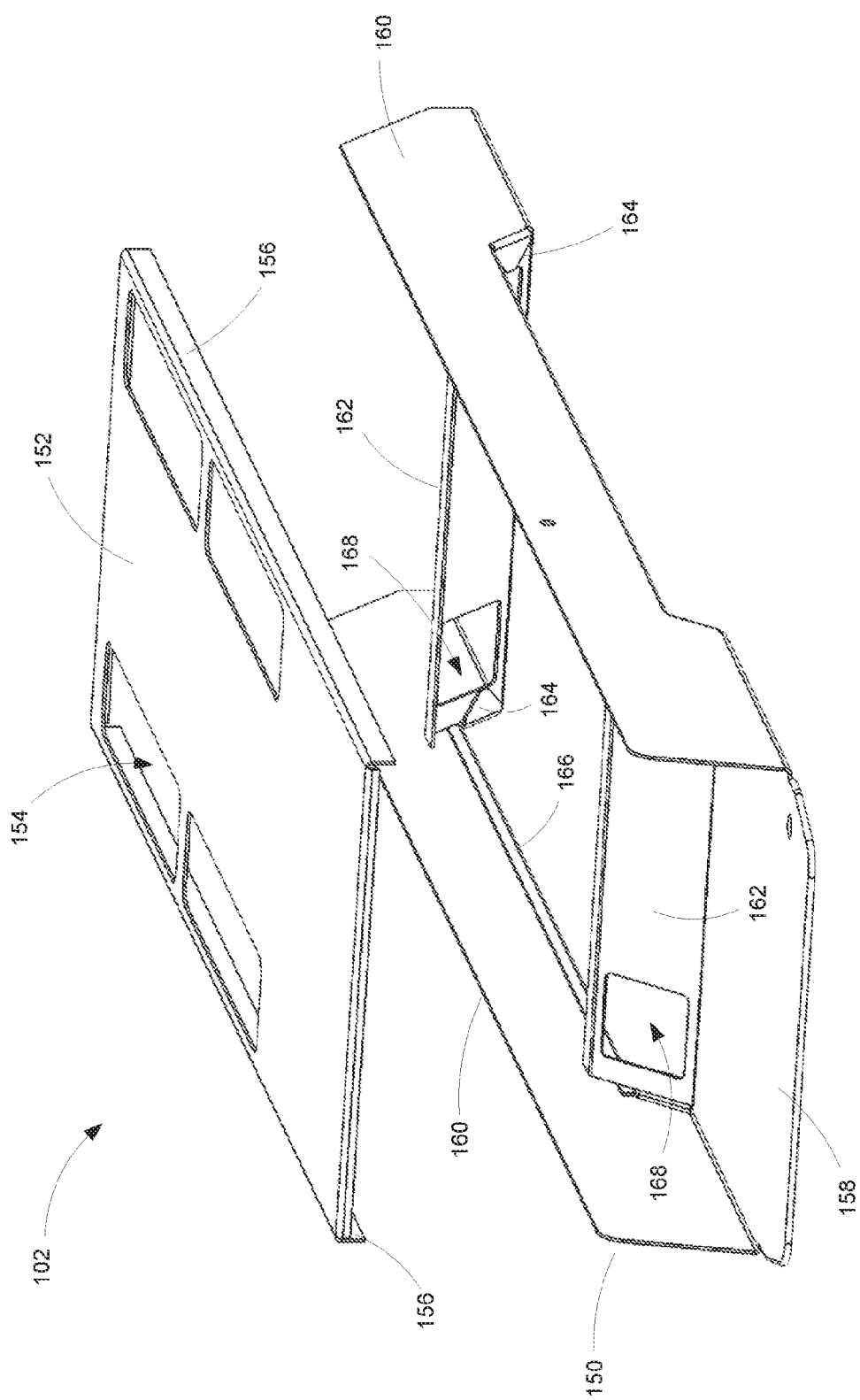
FIG. 6 is an exploded isometric view of the module chassis.

As shown in FIG. 6, the base 150 includes a base panel 158 with sidewalls 160 extending upwardly therefrom. The platform 152 is supported on a pair of support flanges 162 extending from the base panel 158 between the sidewalls 160. Accordingly, the second plurality 134 (FIG. 4) is elevated above the base panel 158. In some embodiments, the support flanges 162 are reinforced with tabs 164. Each support flange 162 includes one or more air flow openings 168 to facilitate air flow movement across the second plurality 134 of memory modules 108. In some embodiments, the base 150 also includes a pair of hems 166 that provide a ledge for flanges 156 of the platform 152 to rest upon. The platform 152 can be spot-welded, welded, bonded, fastened, or otherwise secured to the base 150. In some embodiments, the module chassis 102 comprises sheet metal material.

Remarks

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A computer module, comprising:
a motherboard having first and second sides;
a first plurality of elongate memory sockets mounted to the first side and spaced apart from each other a first distance;
a second plurality of elongate memory sockets mounted to the second side and spaced apart from each other by the first distance, wherein the second plurality of elongate memory sockets is parallel to and laterally offset from the first plurality of elongate memory sockets by a second distance less than the first distance; and
one or more memory modules oriented perpendicular to the motherboard and mated with selected ones of the first or second plurality of elongate memory sockets.

2. The computer module of claim 1, wherein each elongate memory socket comprises one or more alignment features extending through the motherboard.

3. The computer module of claim 1, wherein the elongate memory sockets include surface mount contacts connected to the motherboard.

4. The computer module of claim 1, further comprising one or more central processing units mounted to the first side.

5. The computer module of claim 1, wherein the second distance is approximately half of the first distance.

6. The computer module of claim 1, wherein the second plurality is offset inboard of the first plurality.

7. The computer module of claim 1, wherein each elongate memory socket comprises one or more alignment features extending through the motherboard and surface mount contacts connected to the motherboard;

wherein the second distance is approximately half of the first distance;

wherein the second plurality is offset inboard of the first plurality; and further comprising one or more central processing units mounted to the first side.

8. A computer module, comprising:
a module chassis;
a motherboard having first and second sides mounted to the module chassis, wherein at least a portion of the second side confronts a portion of the module chassis;
at least one central processing unit mounted to the first side;
a first plurality of elongate memory sockets mounted to the first side and spaced apart from each other a first distance;
a second plurality of elongate memory sockets mounted to the second side and spaced apart from each other by the first distance, wherein the second plurality of elongate memory sockets is parallel to and laterally offset from the first plurality of elongate memory sockets by a second distance approximately half the first distance; and
one or more memory modules mated with selected ones of the first or second plurality of memory sockets.

9. The computer module of claim 8, wherein each elongate memory socket comprises one or more alignment features extending through the motherboard.

10. The computer module of claim 8, wherein the elongate memory sockets include surface mount contacts connected to the motherboard.

11. The computer module of claim 8, wherein the first plurality comprises four sets of three elongate memory sockets.

12. The computer module of claim 8, wherein the second plurality is offset inboard of the first plurality.

13. The computer module of claim 8, wherein the second plurality extends through the portion of the module chassis.

14. A computer module, comprising:
a motherboard having first and second sides;
a first plurality of spaced apart memory sockets mounted to the first side;
a second plurality of spaced apart memory sockets mounted to the second side and parallel with the first plurality of spaced apart memory sockets, wherein selected ones of the second plurality of memory sockets are positioned between corresponding ones of the first plurality of memory sockets; and
one or more memory modules oriented perpendicular to the motherboard and mated with selected ones of the first or second plurality of memory sockets.

15. The computer module of claim 14, wherein each memory socket comprises one or more alignment features extending through the motherboard.

16. The computer module of claim 14, wherein the memory sockets include surface mount contacts connected to the motherboard.

17. The computer module of claim 14, further comprising one or more central processing units mounted to the first side.

18. The computer module of claim 14, wherein the first plurality comprises four sets of three memory sockets.

19. The computer module of claim 14, wherein the second plurality is offset inboard of the first plurality.

20. The computer module of claim 14, wherein each memory socket comprises one or more alignment features extending through the motherboard and surface mount contacts connected to the motherboard;
wherein the first plurality comprises four sets of three memory sockets;
wherein the second plurality is offset inboard of the first plurality; and
further comprising one or more central processing units mounted to the first side.

* * * * *